United States Patent Office 2,829,963
Patented Apr. 8, 1958

2,829,963

METHOD OF RECOVERING NICKEL FROM NICKEL AND IRON BEARING ORES

Arthur Norman Hixson, Moylan, and Conrad B. Bare, Lebanon, Pa., assignors to Bethlehem Steel Company, a corporation of Pennsylvania No Drawing. Application April 22, 1955
Serial No. 503,330

10 Claims. (Cl. 75—103)

Our invention relates to the removal of nickel from ores which also contain iron. It also relates to the removal of both nickel and cobalt from iron bearing ores which contain both nickel and cobalt. It particularly relates to the treatment of such lateritic iron ores, containing iron and nickel, as exist in Cuba and other places. Our invention is directed to a process involving the use of an aqueous ammoniacal solution of an ammonium salt of an acid of the group consisting of carbonic, sulphuric, nitric and hydrochloric acids.

It is not new to treat lateritic ores of Cuba containing iron, nickel and cobalt with an aqueous ammoniacal ammonium carbonate solution to dissolve and remove nickel and cobalt from such ores. In the prior art processes, the ore is subjected to a reducing roast and is then mixed with an ammoniacal ammonium carbonate solution to form a slurry into which air is blown. During this aeration of the slurry soluble complexes of the nickel and cobalt are formed which go into solution. Following this treatment the solution, containing nickel and cobalt, is separated from the ore.

The prior art process, thus briefly outlined, has several serious drawbacks. One of the most serious drawbacks is incidental to the action of the reducing operation which precedes the leaching of the ore. To render the nickel in the ore effectively susceptible to the dissolving action of the ammoniacal ammonium carbonate solution leach it is necessary that the ore be first reduced to a sufficient degree. If it is not reduced enough, the nickel will not be satisfactorily removed from the ore in the subsequent leach. But unfortunately, a sufficient degree of reduction of the ore to render the nickel soluble in an ammoniacal ammonium carbonate solution also reduces a considerable amount of the ferric iron to the ferrous state in which condition a considerable quantity of the iron is dissolved in the ammoniacal ammonium carbonate solution during the leaching stage of the process. During the aeration of the slurry of reduced ore and ammoniacal ammonium carbonate solution the dissolved iron in the ferrous state is oxidized by the air to form a ferric compound precipitate which interferes seriously with the removal of nickel from the ore. The consequence has been that in the practice of this prior art practice a substantial amount of nickel is left in the ore. Part of the nickel is removed from the ore but enough is left in the ore to prevent the treated ore from being used in the general manufacture of irons and steels which are required to have low nickel contents.

Another drawback of the prior practice is its failure to remove the major part of the cobalt of the ore.

Another important disadvantage of the prior art practice resides in the necessity to aerate the slurry of the ore and ammoniacal ammonium carbonate solution. This aeration requires additional equipment and the use of a considerable quantity of power. Moreover, the aeration strips the solution of ammonia and if the solution is not replenished with ammonia the amount of nickel removed from the ore is seriously reduced.

These, and other disadvantages, are avoided by our process. Our process comprises the steps of subjecting the ore to a reducing roast, mixing the reduced ore in a finely divided state with an aqueous ammonical ammonium salt solution in an amount sufficient to dampen the ore but insufficient to lump or cake the ore, bringing an oxygen and ammonia containing gas into intimate contact with the mass of dampened ore, and washing the thus treated ore with an aqueous ammoniacal ammonium salt solution to remove nickel and also to remove cobalt, if cobalt is present in the ore.

In describing the process we will show its application to the treatment of Mayari type iron ores, which are lateritic ores found in great quantities in Cuba, containing a considerable content of iron and smaller contents of chromium, nickel and cobalt. The composition of these ores in general run about as follows:

| | Percent |
|---|---|
| Fe | 50.0 to 60.0 |
| Ni | 0.5 to 1.4 |
| Co | 0.06 to 0.25 |
| Cr | 1.6 to 2.8 |
| $Al_2O_3$ | 4.0 to 18.0 |
| $SiO_2$ | 2.0 to 6.0 | and small amounts of substances such as manganese, magnesia, and titania. Because of the large quantities of these ores, and their high iron contents it is very desirable that they be made available as a source of iron in the general manufacture of irons and steels. These ores cannot be used directly in the general manufacture of irons and steels because of their nickel content. In modern steel-making it is essential that the source of iron be very low in nickel because of the very low nickel content permissible in the general manufacture of steels. Accordingly it is necessary that most of the nickel be removed from them before they can be used in general iron and steel manufacture. Unfortunately, a portion of the nickel in these ores is exceedingly difficult to remove to produce a product sufficiently low in nickel to be available in general iron and steelmaking. In the present process the nickel content is reduced to a very low figure.

We will first give a specific example of our process and will then show how the various factors of the process may be varied within certain limitations.

Mayari type ore of the following analysis was treated:

| | Percent |
|---|---|
| Fe | 55.0 |
| Ni | 0.93 |
| Co | 0.13 |
| Cr | 2.3 |
| $Al_2O_3$ | 9.8 |
| $SiO_2$ | 3.8 | and small amounts of substances such as manganese, magnesia, and titania. The ore, in a finely divided state was first subjected to drying at a temperature of 250° F. The dried ore was placed in a reducing chamber where it was maintained at a temperature of 1200° F. for 2 hours, while passing a mixture of carbon dioxide and carbon monoxide through the chamber, the ratio by volume of $CO_2$ to CO being 1.0 to 1.0. The ore thus treated was allowed to cool in the $CO_2$-CO atmosphere and then transferred, while still protected against oxidation by the $CO_2$-CO atmosphere, to a mixing vessel. The ore thus reduced was found to contain about 52% of the iron in the ferrous state.

In the mixing vessel the reduced ore was treated with an aqueous ammoniacal ammonium carbonate solution in an amount sufficient to dampen the ore but insufficient to make a slurry. In fact, the amount of solution added was insufficient to cause the ore to lump or cake.

The amount of solution added in this particular example of our process was equal to about 25% of the weight of the reduced ore being treated. The aqueous ammoniacal ammonium carbonate solution employed in this example contained 22% $NH_3$ and 22% $CO_3$.

This reduced ore, thus dampened with ammoniacal ammonium carbonate solution, was then agitated in an oxidizing chamber while passing a gas mixture consisting of 3.0% oxygen, 67% ammonia gas, and 30% nitrogen through the chamber, this treatment being continued for 20 minutes. During this treatment, iron in the reduced ore is oxidized, the temperature of the ore rising during the oxidation to a maximum of about 140° F. after about 4 minutes and then gradually subsiding.

Following this oxidation stage of the process the treated ore was mixed with an aqueous ammoniacal ammonium carbonate solution containing 11% $NH_3$ and 11% $CO_3$, in sufficient quantity to form a thin slurry. This slurry was subjected to a magnetizing treatment. Following this magnetizing treatment, the ore was allowed to settle and the solution, containing nickel and cobalt, decanted. The settled ore was mixed with more ammoniacal ammonium carbonate solution of the same analysis as just given, settled and the solution decanted, a series of such settlings and decantations being given.

On repeated operations of this specific example of our process, on the particular ore analysis given above, the resulting ore product contained essentially all the iron of the ore and from 0.038% to 0.041% nickel. The cobalt content of this product averaged about 0.05%. The ore and solution are easily separated from each other as the ore treated by our process settles very readily and is easily filterable.

In this example of our process, the conditions of operation have been set forth specifically. Most of these conditions may be varied within certain limits without losing the essential benefits of our process. The permissible variations of the reduction roast will be considered first.

In the specific example given above, the temperature of the reduction roast was 1200° F. A roasting temperature approximating this works very efficiently with many ores but this temperature may be departed from somewhat with advantage with certain ores. The temperature of roasting should ordinarily be kept between 1000° F. and 1500° F. Preferably, we maintain temperatures of the reduction roast between 1150° F. and 1300° F.

In the specific example given above, the reduction gas used during the reduction roast had a ratio $CO_2/CO$ of 1.0. The ratio may vary somewhat but should be from 2.5 to .5. Preferably we operate between 1.25 and .75.

Instead of a mixture of $CO_2$ and $CO$ as mentioned before, we may use a reducing gas mixture of water vapor and hydrogen. When using the latter mixture the ratio $H_2O/H_2$ should be from 2.5 to 0.13. Preferably we employ a ratio of .64 to .38.

Instead of using a mixture of $CO_2$ and $CO$, or a mixture of $H_2O$ and $H_2$, a mixture may be employed of $CO_2$, $H_2O$, $CO$ and $H_2$. When using such a mixture, the ratios $CO_2/CO$ and $H_2O/H_2$ during the reduction should be within the limits indicated above.

The lengths of time necessary for the reduction stage of the process varies with different ores. A time longer than that which is necessary does no harm.

In the specific example of our process given above, in the step of dampening the ore prior to the oxidizing stage of the process, the weight of aqueous ammoniacal ammonium carbonate solution mixed with the ore was equal to 25% of the weight of the reduced ore being treated. The percentage used may vary somewhat but there are definite limits which are imposed by the fundamental nature of the process. There must be sufficient solution used to come into contact with all the ore being treated, but the amount used must be insufficient to wet the ore to such an extent as to lump or cake the ore. After the mixing of the ore and solution the ore must be in a loose, discrete condition. In practice, we have found that good results are secured when the weight of solution is equal to from 18% to 30% of the weight of the reduced ore being treated. Somewhat greater percentages and also somewhat lesser, may be employed, subject, of course, to the fundamental principle that sufficient solution must be used to contact all the ore but insufficient to produce a caked ore after thoroughly mixing the solution with the ore.

In the specific example of our process, given above, the aqueous ammoniacal ammonium carbonate solution used to dampen the ore prior to the oxidation stage of the process, contained 22% $NH_3$ and 22% $CO_3$. The composition of the solution may depart somewhat from this. The solution should contain from 8% to 28% ammonia and from 7% to 27% $CO_3$. Preferably, we employ solutions at this stage of our process running from 11% to 22% ammonia and from 11% to 22% $CO_3$.

In the example of our process given above, the specific composition of the gas used in the oxidation stage of the process was given. The composition of the gas can vary over rather wide limits. The essential constituents are oxygen and ammonia. The oxygen of the gas mixture is essential for oxidizing ferrous iron and in changing nickel and cobalt into easily soluble compounds of these metals. The ammonia in the gas is essential to prevent undue stripping of ammonia from the ammoniacal ammonium carbonate solution which wets the ore. Some removal of the ammoniacal ammonium carbonate solution of the leached ore by evaporation usually takes place, but the use of ammonia in the oxidizing gas mixture in suitable amounts prevents the ammonia concentration of the solution which wets the ore from being unduly lowered. The ammonia content of the oxidizing gas mixture also serves as a diluent of the oxygen which is of importance in helping to prevent an undue rise of temperature during the oxidizing of the reduced ore. The ammonia concentration may vary from 30% to 99.5% by volume. Preferably, we use from 45% to 75% by volume.

The oxygen content of the oxidizing gas mixture may vary from 40% to 0.5% by volume. Preferably we use from 2½ to 7% by volume. The oxygen may be introduced into the gas mixture as pure oxygen or as air. When using air the nitrogen of the air acts as a diluent of the oxygen.

In the specific example of our process, given above, nitrogen was mentioned as a constituent of the oxidizing gas mixture. Nitrogen is not indispensable to the success of our process, merely acting as a diluent. If the percentage of ammonia is sufficiently high, oxygen and ammonia alone would suffice.

The maximum temperature reached during the treatment with the oxidizing gas should not be allowed to rise too high when used at or somewhat above atmospheric pressures. Ordinarily when working at about atmospheric pressures the maximum temperature should not be above 160° F. Preferably, we do not permit the maximum temperature to be above 145° F. The maintenance of a high ammonia content, or high ammonia and diluent gas content relative to the oxygen content is useful in controlling temperature rise.

In the specific example of our process, given above, following the oxidizing stage of the process, the ore was washed with an ammoniacal ammonium carbonate solution to remove nickel and cobalt. In this example the ammoniacal ammonium carbonate solution contained 11% $NH_3$ and 11% $CO_3$. The composition of the washing solution can be varied considerably. For the maximum removal of nickel and cobalt it is essential that the ammonia and carbon dioxide content of the wash solution be maintained above certain minimum amounts as long as the washing process is being continued. In no case should the ammonia content of the washing solution be below 5% and the $CO_3$ content below 2.7%. We preferably use solutions containing from 8% ammonia and 7% $CO_3$ to 20% ammonia and 22% $CO_3$. The upper limits of the concentrations are not critical and it is possible to use solutions of greater strength than those mentioned above. In connection with this last assertion, the controlling factors are primarily economic since the higher strength solution involve the recovery of greater amounts of ammonia and carbon dioxide in order to remove the metal values from solutions and the equipment handling these solutions becomes more complex. The ratio of the ammonia and carbon dioxide concentrations is not critical, and it can be varied considerably from the values cited without loss of effectiveness. However, the extremes as represented by substantially pure ammonium hydroxide on the one hand and a composition equivalent to pure ammonium carbonate, on the other hand, are not as satisfactory.

The washing procedure can be carried out in conventional equipment adapted to prevent the loss of ammonia and carbon dioxide vapors. The operation may be either batch-wise or continuous. A conventional countercurrent decantation system can be used to advantage in building up the concentrations of the metal values in the effluent stream from the washing process.

In the specific example of our process, given above, mention was made of the fact that when the ore, following the oxidizing stage, was mixed with the ammoniacal ammonium carbonate wash solution, the resulting slurry was subjected to a magnetizing treatment. It has been found that physical handling of the oxidized ore in the leaching or washing stage can be greatly improved by subjecting the ore to a magnetizing treatment. This apparently causes a degree of agglomeration of the ore particles which significantly improves its settling, thickening and filtering characteristics. This magnetizing can be accomplished by any one of several standard methods. One that has proved effective is to pass a slurry of the oxidized ore in the ammoniacal ammonium carbonate leaching solution through a non-magnetic conduit, such as a rubber or plastic pipe, which is surrounded by a coil carrying a direct electrical current. This treatment can be used at the start of the leaching operation or at several stages of such leaching operation.

As stated earlier in this specification, one of the advantages of our process is that it is not necessary to aerate the slurry of ore and ammonia carbonate leach solution during the removal of nickel and cobalt from the ore. However, we have found that aeration of the slurry will not impair the recovery of nickel and cobalt in our process so long as sufficiently high ammonia and carbon dioxide concentrations are maintained in the solution. In practice we do not aerate as it appears to serve no useful purpose.

In the above examples of our process, ammoniacal ammonium carbonate solutions are used for dampening the ore prior to the oxidizing treatment and ammoniacal ammonium carbonate solutions are used subsequent to the oxidizing treatment to leach the treated ore to remove nickel and cobalt therefrom. In its broader aspects, however, our process is not limited to such solutions. Ammoniacal solutions of other ammonium salts than the carbonate may be used, namely, ammoniacal solutions of ammonium sulfate, ammonium nitrate and ammonium chloride. Our process in its broader aspects, therefore, comprises the step of moistening the ore with an ammoniacal solution of an ammonium salt of an acid of the group consisting of carbonic, sulphuric, nitric and hydrochloric acids preceding the oxidation step, and the step of leaching the ore after the oxidation step with an ammoniacal solution of an ammonium salt of the group consisting of carbonic, sulphuric, nitric and hydrochloric acids.

In employing ammoniacal solutions of ammonium sulphate, nitrate or chloride the same amounts of solution and of the same concentration will be employed, as when using ammoniacal ammonium carbonate solutions. For example, we have said above that the ammoniacal ammonium carbonate solution used in wetting the ore prior to the oxidation treatment should contain from 8% to 28% $NH_3$ and from 7% to 27% $CO_3$. When using ammoniacal solutions of the other ammonium salts, whether sulphate, nitrate, or chloride, the $NH_3$ content will be from 8% to 28% and the acid radical content should be between 7% to 27% whether such radical is $(SO_4)$, $(NO_3)$ or $(Cl)$.

The oxidation treatment of the ore dampened with an ammoniacal ammonium salt solution is the same regardless of what the acid radical is of the ammonia salt used, i. e. the oxidation treatment is the same regardless of whether the dampening solution is an ammoniacal solution of ammonium carbonate, sulphate, nitrate or chloride.

Although ammoniacal solutions of any of the ammonium salts mentioned may be used to leach the ore, following the oxidation treatment, we usually prefer to use ammoniacal ammonium carbonate solutions for the leaching step even though the dampening solution used prior to oxidation may have been an ammoniacal solution of ammonium sulphate, nitrate or chloride.

Although we have hereinabove described our invention in considerable detail, we do not wish to be limited narrowly to the exact and specific particulars described, but we may also use such substitutions, modifications, or equivalents thereof as are embraced within the scope of the invention, or pointed out in the appended claims.

This application is a continuation-in-part of our application Serial No. 452,467, filed August 26, 1954.

We claim:

1. A process for removing nickel from an ore containing iron and nickel which comprises the steps of subjecting the ore to a reducing roast, mixing the reduced ore with an aqueous ammoniacal solution of an ammonium salt of an acid of the group consisting of carbonic, sulphuric, nitric and hydrochloric acids in amount sufficient to dampen the ore but insufficient to cake the ore, passing a gas containing oxygen and ammonia into intimate contact with the dampened ore, and leaching the thus treated ore with an ammoniacal solution of an ammonium salt of an acid of the group consisting of carbonic, sulphuric, nitric and hydrochloric acids.

2. A process for removing nickel from an ore containing iron and nickel which comprises the steps of subjecting the ore to a reducing roast, mixing the reduced ore in a finely divided condition with an aqueous ammoniacal solution of an ammonium salt of an acid of the group consisting of carbonic, sulphuric, nitric and hydrochloric acids, such solution containing 8% to 28% ammonia and 7% to 27% of the acid radical of the ammonium salt, the amount of such solution being sufficient to dampen the ore but insufficient to cake the ore, passing a gas containing oxygen and ammonia into intimate contact with the dampened ore to oxidize ferrous iron, and washing the thus treated ore with an ammoniacal solution of an ammonium salt of an acid of the group consisting of carbonic, sulphuric, nitric and hydrochloric acids to remove nickel from the ore.

3. A process for removing nickel from an ore containing iron and nickel which comprises the steps of subjecting the ore to a reducing roast, mixing the reduced ore with an aqueous ammoniacal ammonium carbonate solution in amount sufficient to dampen the ore but insufficient to cake the ore, passing a gas containing oxygen and ammonia into intimate contact with the dampened ore, and leaching the thus treated ore with an ammoniacal ammonium carbonate solution to remove nickel.

4. A process for removing nickel from an ore containing iron and nickel which comprises the steps of subjecting the ore to a reducing roast, mixing the reduced ore in a finely divided condition with an aqueous ammoniacal ammonium carbonate solution in an amount sufficient to dampen the ore but insufficient to cake the ore, passing a gas containing oxygen and ammonia into intimate contact with the dampened ore, mixing the ore thus treated with an aqueous ammoniacal ammonium carbonate solution to form a slurry, subjecting the slurry to a magnetizing flux and separating the solution containing nickel from the slurry.

5. A process for removing nickel from an ore containing iron and nickel which comprises the steps of subjecting the ore to a reducing roast, mixing the reduced ore in a finely divided condition with an aqueous ammoniacal ammonium carbonate solution containing $NH_3$ 8% to 28% and $CO_3$ 7% to 27%, the amount of such solution being sufficient to dampen the ore but insufficient to cake the ore, passing a gas containing oxygen and ammonia into intimate contact with the dampened ore to oxidize ferrous iron, and washing the thus treated ore with an ammoniacal ammonium carbonate solution to remove nickel from the ore.

6. A process for removing nickel from an ore containing iron and nickel which comprises the steps of subjecting the ore to a reducing roast, mixing the reduced ore in a finely divided condition with an aqueous ammoniacal ammonium carbonate solution containing $NH_3$ 11% to 22% and $CO_3$ 11% to 22%, the amount of such solution being sufficient to dampen the ore but insufficient to cake the ore, passing a gas containing oxygen and ammonia into intimate contact with the dampened ore to oxidize ferrous iron, and washing the thus treated ore with an ammoniacal ammonium carbonate solution to remove nickel from the ore.

7. A process for removing nickel from ore containing nickel and iron which comprises the steps of subjecting the ore to a reducing roast, mixing the reduced ore with an aqueous ammoniacal ammonium carbonate solution in an amount sufficient to moisten the ore but insufficient to cake the ore, such aqueous ammoniacal ammonium carbonate solution containing 8% to 28% $NH_3$ and 7% to 27% $CO_3$, passing a gas comprising oxygen and ammonia into intimate contact with the moistened ore, such gas containing oxygen between 40% and 0.5% and ammonia from 30% to 99.5%, and washing such ore with an aqueous ammoniacal ammonium carbonate solution to remove nickel from the ore.

8. A process for removing nickel from an ore containing nickel and iron which comprises the steps of subjecting the ore to a reducing roast, mixing the reduced ore in a finely divided condition with an aqueous ammoniacal ammonium carbonate solution containing $NH_3$ 11% to 22% and $CO_3$ 11% to 22%, the amount of such solution being sufficient to dampen the ore but insufficient to cake the ore, passing a gas containing oxygen 40% to 0.5% by volume and ammonia 30% to 99.5% by volume into intimate contact with the dampened ore, and washing such ore with an aqueous ammoniacal ammonium carbonate solution to remove nickel from the ore.

9. A process for removing nickel from ore containing nickel and iron which comprises the steps of subjecting the ore to a reducing roast, mixing the reduced ore in a finely divided condition with an aqueous ammoniacal ammonium carbonate solution in amount sufficient to moisten the ore but insufficient to take the ore, such aqueous ammoniacal ammonium carbonate solution containing $NH_3$ 11% to 22% and $CO_3$ 11% to 22%, passing a gas comprising oxygen and ammonia into intimate contact with the moistened ore, such gas containing oxygen between 2½% and 7% by volume and ammonia from 45% to 75% by volume and washing such ore with an ammoniacal ammonium carbonate solution to remove nickel from the ore.

10. A process for removing nickel from ore containing nickel and iron which comprises the steps of subjecting the ore to a reducing roast, mixing the reduced ore in a finely divided condition with an aqueous ammoniacal ammonium carbonate solution in amount sufficient to moisten the ore but insufficient to cake the ore, such aqueous ammoniacal ammonium carbonate solution containing $NH_3$ 11% to 22% and $CO_3$ 11% to 22%, passing a gas comprising oxygen and ammonia into intimate contact with the moistened ore, such gas containing oxygen between 2½% and 7% by volume and ammonia from 45% to 75% by volume and washing such ore with an aqueous ammoniacal ammonium carbonate solution containing $NH_3$ 8% to 20% and $CO_3$ 7% to 22% to remove nickel from the ore.

References Cited in the file of this patent
UNITED STATES PATENTS

| | | |
|---|---|---|
| 682,232 | Beck | Sept. 10, 1901 |
| 702,047 | Collins | June 10, 1902 |
| 2,663,618 | Babbitt et al. | Dec. 22, 1953 |
| 2,717,829 | Dougherty | Sept. 13, 1955 |

OTHER REFERENCES

Forward et al.: "A Method for Adapting the Ammonia-Leaching Process to the Recovery of Copper and Nickel from Sulphide Ore and Concentrate," The Canadian Mining and Metallurgical Bulletin, June 1948, page 350.

U. S. DEPARTMENT OF COMMERCE
PATENT OFFICE

CERTIFICATE OF CORRECTION

Patent No. 2,829,963   Arthur Norman Hixson et al.        April 8, 1958

It is hereby certified that error appears in the printed specification of the above numbered patent requiring correction and that the said Letters Patent should read as corrected below.

Column 8, line 15, for "to take the ore" read -- to cake the ore --.

Signed and sealed this 3rd day of June 1958.

(SEAL)
Attest:
KARL H. AXLINE
Attesting Officer

ROBERT C. WATSON
Commissioner of Patents